No. 860,960. PATENTED JULY 23, 1907.
W. W. BROGA.
MACHINE FOR COUNTING, REGISTERING, AND OTHERWISE HANDLING COINS
APPLICATION FILED NOV. 28, 1904.

Witnesses:
F. L. Sprague
G. R. Driscoll

Inventor:
William W. Broga,
by Wm. S. Bellows,
Attorney.

No. 860,960. PATENTED JULY 23, 1907.
W. W. BROGA.
MACHINE FOR COUNTING, REGISTERING, AND OTHERWISE HANDLING COINS.
APPLICATION FILED NOV. 28, 1904.

Witnesses:
H. L. Sprague
G. R. Driscoll

Inventor,
William W. Broga,
by Wm. S. Bellows,
Attorney.

No. 860,960. PATENTED JULY 23, 1907.
W. W. BROGA.
MACHINE FOR COUNTING, REGISTERING, AND OTHERWISE HANDLING COINS
APPLICATION FILED NOV. 28, 1904.

No. 860,960. PATENTED JULY 23, 1907.
W. W. BROGA.
MACHINE FOR COUNTING, REGISTERING, AND OTHERWISE HANDLING COINS.
APPLICATION FILED NOV. 28, 1904.

No. 860,960. PATENTED JULY 23, 1907.
W. W. BROGA.
MACHINE FOR COUNTING, REGISTERING, AND OTHERWISE HANDLING COINS.
APPLICATION FILED NOV. 28, 1904.

No. 860,960. PATENTED JULY 23, 1907.
W. W. BROGA.
MACHINE FOR COUNTING, REGISTERING, AND OTHERWISE HANDLING COINS.
APPLICATION FILED NOV. 28, 1904.

Witnesses:
H. L. Sprague
G. R. Driscoll

Inventor,
William W. Broga,
by Wm. S. Bellows,
Attorney.

UNITED STATES PATENT OFFICE.

WILLIAM W. BROGA, OF SPRINGFIELD, MASSACHUSETTS.

MACHINE FOR COUNTING, REGISTERING, AND OTHERWISE HANDLING COINS.

No. 860,960.   Specification of Letters Patent.   Patented July 23, 1907.

Application filed November 28, 1904. Serial No. 234,444.

*To all whom it may concern:*

Be it known that I, WILLIAM W. BROGA, a citizen of the United States of America, and a resident of Springfield, in the county of Hampden and State of Massachusetts, have invented certain new and useful Improvements in Machines for Counting, Registering, and Otherwise Handling Coins, of which the following is a full, clear, and exact description.

This invention relates to counting and registering mechanism, and more especially to that class thereof whereby coins of various denominations may be counted to obtain the total value as indicated in dollars and cents shown in plain figures of an adding machine or register; and my invention is especially adapted for use in connection with a coin-sorting machine whereby each species is deposited in its own individual channel or pocket from which the coins are consecutively taken, one by one, counted off into stacks representing a certain monetary value, and finally delivered to a mechanism whereby each stack is wrapped in paper to form certified coin-rolls.

The following statement will serve to illustrate the particular purpose for which my present invention is especially intended, and a clear conception of its function in daily business life will be readily obtained therefrom. In nearly all of the larger cities where street-railways are in existence, the conductors of the cars are required to make their returns immediately upon the completion of their last trip, daily, and in some instances several times during the day. As a matter of course, these returns are principally in the form of coins ranging from cent-pieces to silver dollars, and, inasmuch as the time which can be given to verifying the amount of cash received with the statement or report of the conductor, is limited, accuracy in counting constitutes an important factor in disposing of this part of the routine business with any degree of rapidity. Moreover, it is evident, that great caution must be exercised by the men, when receiving fares, that distorted coins will not be accepted by them; and yet occurrences of this nature are comparatively frequent, in spite of strict rules and regulations, the absence of which would entail considerable loss to the company.

It has been my aim, therefore, to provide a machine, which is adapted, firstly: to receive a mass of coins, indiscriminately as to value or size; secondly: to sort these coins according to their sizes of diameter, and to their weights and deposit them into a series of corresponding chutes, respectively; thirdly: to carry the several coins of each chute, consecutively past a mechanism which will be actuated to eject from the carrier anything having a greater thickness than is consistent with the standard coin of each particular chute, (as, for instance when two coins are stuck together); fourthly:
to add the value of each coin forming a part of the mass, not only on an individual computer for this particular mass, but also on a total computer which gives the total day's receipts; fifthly: to count off a certain number of good coins in each chute necessary to constitute a certain value, and sixthly: to wrap this number of coins into a package of certified value, ready to be handed out as change, as for instance 50 dimes in a sealed package in exchange for 5 dollars.

In the present instance I do not deem it necessary to enter into details concerning the mechanism which deals with the first two items above enumerated, as the coin-sorting machine preferably used by me, constitutes subject matter for a separate application for Letters Patent filed by me October 31, 1904, No. 230,832. Neither will it be of benefit to give any detailed description of the construction and operation of the wrapping machine, as this also forms the subject matter of another application for Letters Patent, filed by me December 19, 1904, No. 237,540, covering the sixth item above mentioned. Consequently we have now to deal principally with the computing mechanism, which insures that each coin will be taken care of individually and its value recognized on a mass-adding machine, as well as on a total computer whereby the values of the several consecutive masses will be footed up to a grand total of the day's receipts.

In view of the foregoing, my present invention has for one of its objects the provision of a device which prevents a pair of coins, when stuck together, being counted as one only, and which acts as an ejector, so that the operator may be enabled to separate the coins and then throw them back singly into the sorting machine hopper.

My invention has, furthermore, for its object the provision of a positively and continually-operative coin-carrier for subjecting each coin, after it has left the chute, to the thickness test, to engagement with the registering mechanism, the latter being actuated only by the actual passage of a coin in the carrier.

My invention has, furthermore, for its object the provision of a coin tube or pocket for receiving the coins, successively after they have been registered, and the combination therewith, of a coin retaining device, adapted to be withdrawn after a certain number of coins have accumulated in said pocket, and to permit these coins to enter the wrapping machine.

My invention has, furthermore, for its object the provision of a pair of registering devices, normally coacting so that each device adds every individual coin value to its previous registry or indication, but so organized that either device may be reset to zero without in any way changing the register of the other.

Further objects of the invention may be attained by the particular construction and organization of some of the several elements comprising my improved machine, as will be hereinafter described and particularly pointed out in the claims.

The invention is clearly shown in the accompanying drawings, in which similar characters denote similar parts, and in which:

Fig. 6 is an end view of the counting mechanism, on an enlarged scale, and corresponding with Fig. 2. Fig. 6$^a$ is a face view of one of the cams employed. Figs. 19 and 20 represent one of the computers shown sectionally and enlarged, and more especially making clear the resetting device, a plurality of the wheels being shown, in Fig. 19, in section on the plane of their axes, while Fig. 20 is as seen to the leftward beyond the section line 20—20, Fig. 19.

Similar characters of reference indicate like parts in all of the views.

As above stated, my present invention has for its subject matter a computing mechanism for registering and ascertaining the monetary value of a mass of coins of various sizes and denominations, these coins being primarily deposited into a hopper of what may be termed a "sorting machine."

While it is evident that any suitable sorting mechanism may be used to separate each species of coins preparatory to their entrance into the counting machine, I have shown in the drawings a sorting machine for which I have filed an application for Letters Patent as aforesaid and to which reference may be had if so desired, and it will, therefore, be sufficient in the following description to refer to some of the parts thereof in a general way, only. The same circumstances exist in regard to the wrapping mechanism application for patent for which has been filed as aforementioned. which receives a certain number of coins of each species and wraps them into packages or what is generally known as "coin rolls" of predetermined value. As a matter of fact, the entire device consists of three distinct sections, viz: the sorting machine, the counting mechanism, and the wrapping device, all three being synchronized for successive operation and each one being dependent upon the complete work of that which precedes it.

Referring to the drawings, A represents in a general way; a sorting mechanism, to which the coins are conducted from a receiver or hopper B, by a downwardly inclined conductor C$^2$, the coins being poured promiscuously in to the receiver, and then mechanically fed therefrom, flatwise, to the conductor which causes them to assume vertical positions ready to descend into the separator, which distributes them into a series of chutes, $d$, $h$, $q$, $n$, $p$, and $t$, adapted to receive silver dollars, halves, quarters, nickels, pennies, and dimes or ten-cent pieces, respectively, the organization corresponding to the graduated sizes of the coins. Each of these chutes delivers its coins, one by one, to a carrier after the manner shown clearly in Fig. 6, and it may be stated at this time, that inasmuch as this mechanism is similar in all of the chutes, the following description of the dime-chute is deemed sufficient to apply to all of the others, as well.

Disposed near the end of the chute $t$, is a device for permitting only one coin to leave the chute at a time, this device partaking of the nature of an escapement comprising a plate 30, having rearwardly-projecting pins 31, 32, and mounted on a rock-spindle 33, which is supported in the chute walls and has a spring-actuated arm 34, the free end 34′ of which projects into the casing or runway 35, through which the coins are taken by a carrier 36$^t$ on a shaft E. The spindle 33 is normally held so as to bring the pins 31 into the path of the coins descending in the chute, by a spring 37, Fig. 10, and to raise the pins 32; thus permitting a coin to descend into the runway until it rests against a stationary stop plate 38, and on top of a projecting ledge 39. The dime remains in this position until it is picked up by one of a pair (or any suitable number as may be provided) of lugs 40, provided on the carrier 36$^t$, consisting substantially of a disk which is secured to the continuously-rotating shaft E. The lugs are disposed diametrically-opposite on the carrier, and each is arched and cut away or otherwise suitably constructed, to avoid striking the stationary stop plate 38 and the ledge 39, above mentioned. (See Fig. 10), and yet engages the coin in the runway 35. As the coin is advanced by the carrier, it contacts with the feeler end 34′ of the lever 34, which will then be rocked to raise the pins 31 and simultaneously depress the pins 32, so that the next coin in the chute may then pass the pins 31 and come to rest against the pins 32. As soon as the coin in the carrier has passed by the feeler end 34′, the spring 37 will return the lever 34 to its original position, throwing the pins 31 again into the path of the coins in the chute, and liberating the coin thus far resting against the pins 32, and now permitted to take its position in the runway ready for the near carrier lug. It frequently happens that, especially with dimes, two coins become stuck together, and for that reason, I deem it advantageous to provide means whereby a count of two coins as only one will be prevented, these means being controlled by the abnormal thickness of the double coin, and being effective in throwing the same out of the runway before it has a chance of actuating the counting mechanism.

Practically the device consists of an ejector (see Fig. 13), which comprises an arm 45, pivoted at 46 on the wall of the runway, and carrying a roller 47 which normally projects through an aperture 48 into the path of the advancing coins. The upper end of the arm 45 is connected by an adjustable link 50, with a guard plate 51 fulcrumed at 52 on an ear 53 of the runway, and intermediate portions of the said parts 45 and 51 are connected, as for instance by a spring 54, which also tends to force the roller against the coin to throw it out. As the double coin is thus pushed out of the runway, it will fall into a chute 55 which may end in a receptacle from which the thrown-out coins may be recovered, separated, and then simply put back into the hopper B. The entering position of the roller 47 may be regulated by an adjusting screw 56 and check nut 57, in connection with the lever 45. The coins which are retained in the runway, are discharged therefrom, through an aperture 60, (see Figs. 9 and 11), and means are provided for holding them in the carrier disk 36ᵗ until this aperture has been reached, these means consisting substantially of a resilient guard plate 61, secured on the casing 35. Previous to reaching the discharge opening 60, however, each coin registers its own passage, and actuates the registering mechanism as well as a device which counts off a certain number of coins to form a package.

Figures 6, 6A:
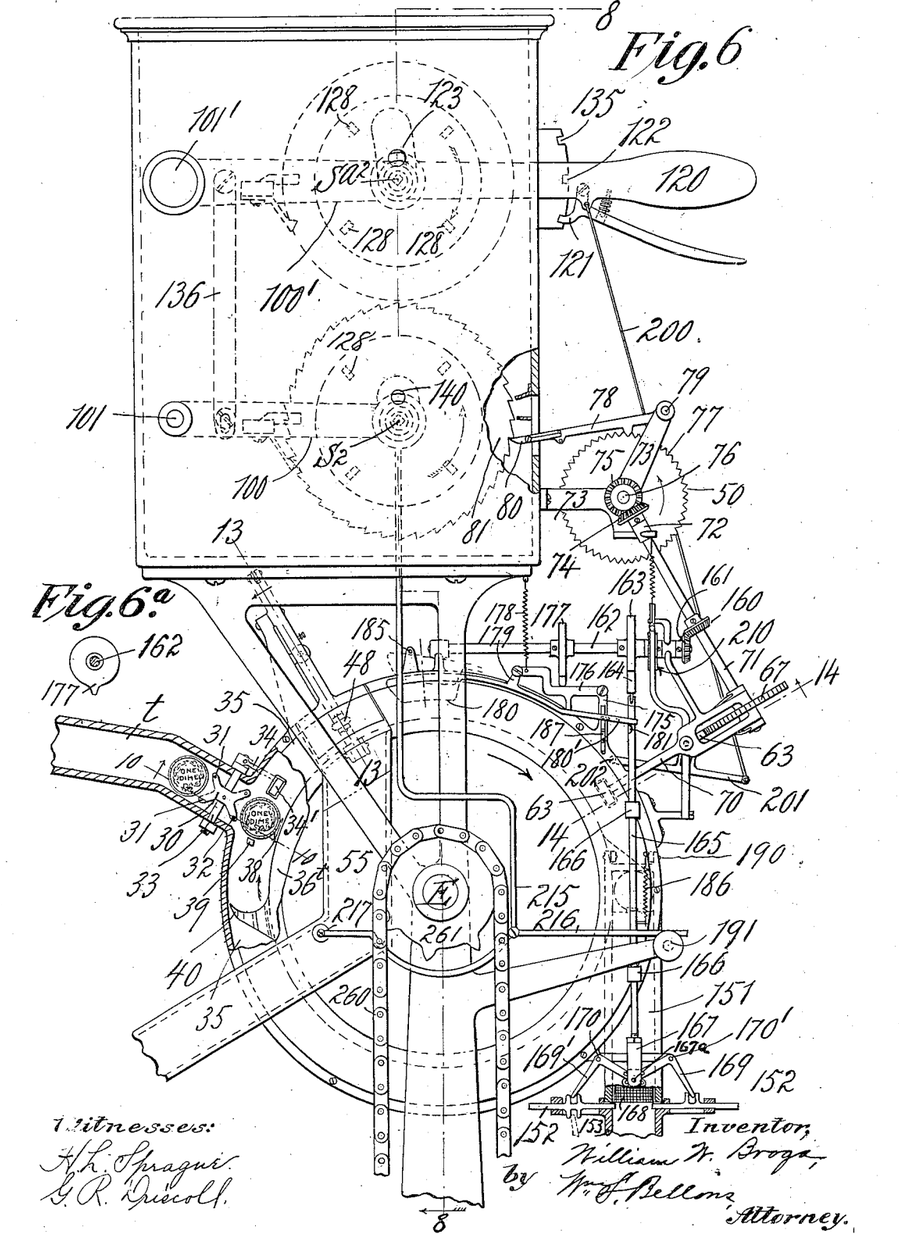
Figures 9, 10, 11, 12, 13, 14:
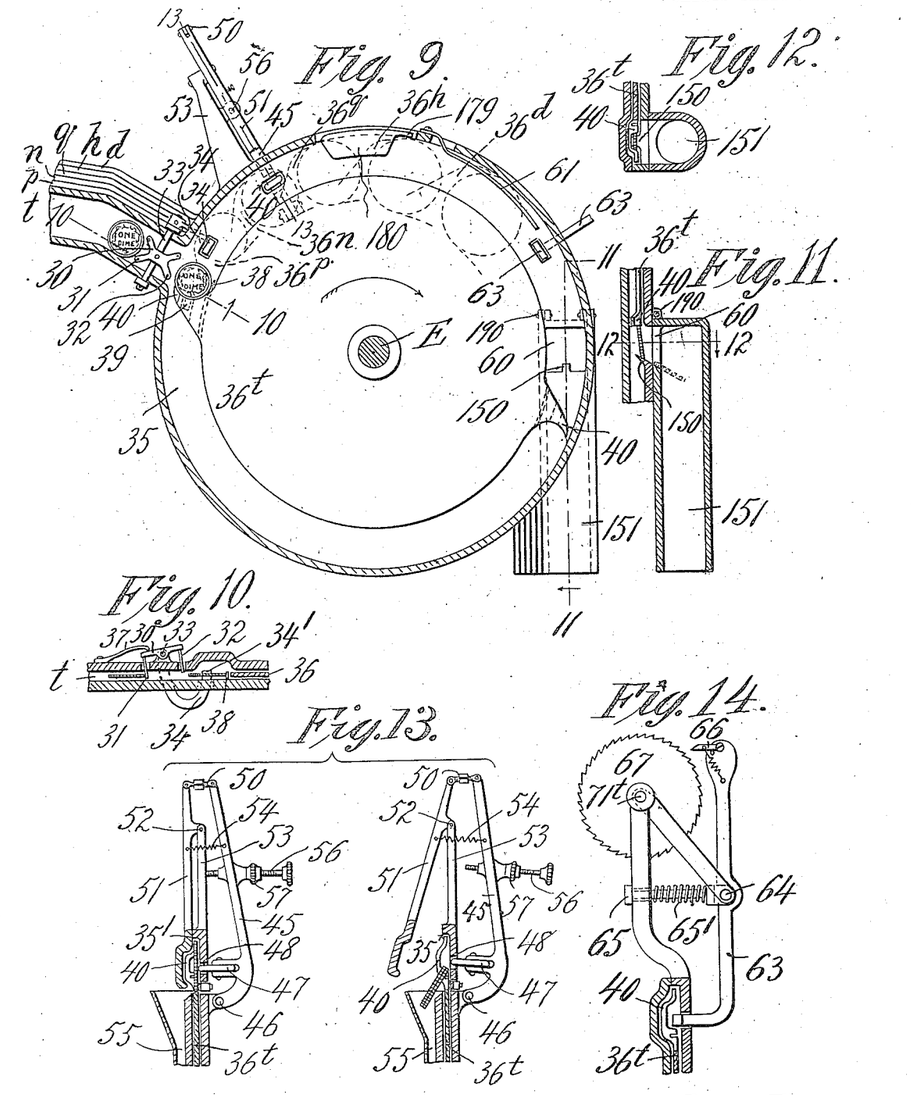
Fig. 9 is an enlarged side view of the carrier handling the smallest size of coins, viz: dimes.
Fig. 10 is a partial sectional plan, on line 10—10, Fig. 9.
Fig. 11 is a partial vertical section on line 11—11 of Fig. 9.
Fig. 12 is a horizontal section on line 12 of Fig. 11.
Fig. 13 is a section on line 13—13 of Figs. 6 and 9.
Fig. 14 is a section line, 14, 14 of Fig. 6.
Figure 15:
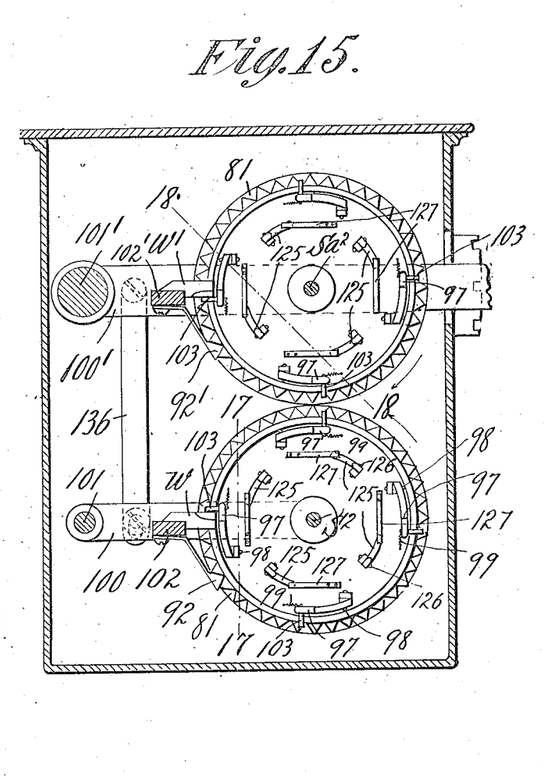
Fig. 15 represents a vertical cross section on line 15—15, of Fig. 8.
Figure 16:
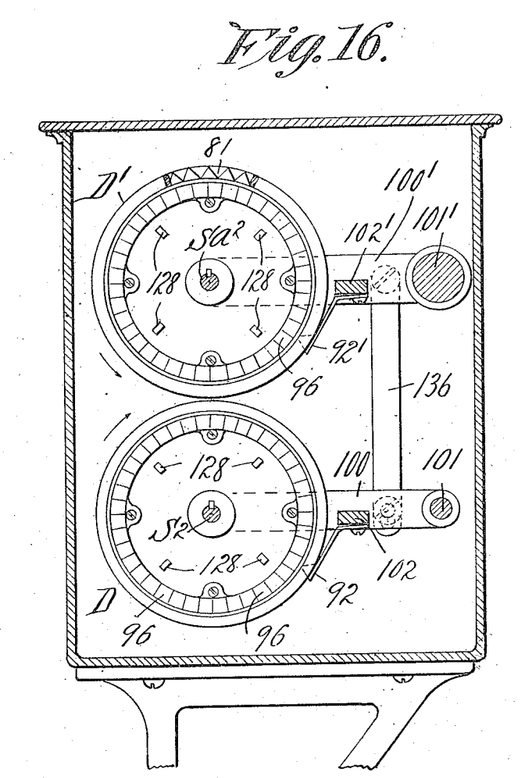
Fig. 16 is a similar view on line 16—16, of Fig. 8.

By referring to Figs. 6 and 14, it will be seen that the lower end of a feeler lever 63 projects normally into the runway 35. This lever is pivoted at 64 on a normally stationary bolt 65, and carries at its upper end a spring-retained pawl 66, adapted to engage and turn a ratchet wheel 67 one tooth, whenever a coin passes the feeler in the runway. In the present organization, the ratchet has fifty teeth, so that one rotation of the ratchet is equal to the passage of fifty dimes past the feeler, and that consequently the registering mechanism should show an increase of five dollars over the previous registration. The manner in which each dime is registered on the register, can be clearly seen in Fig. 6, in which 70 denotes a bracket supporting a shaft 71 on which the ratchet 67 is secured. The upper end of the shaft 71 is journaled in a bearing 72 formed on a bracket 73 secured to the case of the registering device, and said shaft carries a bevel pinion 74 engaging a similar pinion 75 which is mounted on a spindle 76, also journaled in the bracket 75. Secured upon the shaft 76 is a notch-wheel 77, having fifty teeth to correspond in number with those of the ratchet 67, so that each rotation of the latter will result in raising a gravitative lever 78, (fulcrumed at 79 on the bracket 73) fifty times. The forward end of the lever 78 carries a pawl 80 which serves to advance the ratchet 81, of the dime-registering wheel of the registering mechanism, one tooth for each rise of said lever, the dime wheel being preferably provided with four sets of numerals ranging from 0 to 9 each, so that each rotation of the wheel will register forty dimes and increase the record by four dollars. In this connection, it may be stated that it is, of course, immaterial how many sets and corresponding numbers of teeth may be provided on the dime wheel, it being understood, however, that every time when the numeral 0 appears on the reading line, the dollar wheel is advanced one tooth. Now, inasmuch as in the present instance the dime wheel has four sets of numbers on its periphery, it follows that the dollar wheel must be shifted one tooth at the end of every quarter turn of the dime wheel, and this is accomplished in the following manner: (See Figs. 6, 8, 15, 16.)

Figures 2, 3, 17, 18:
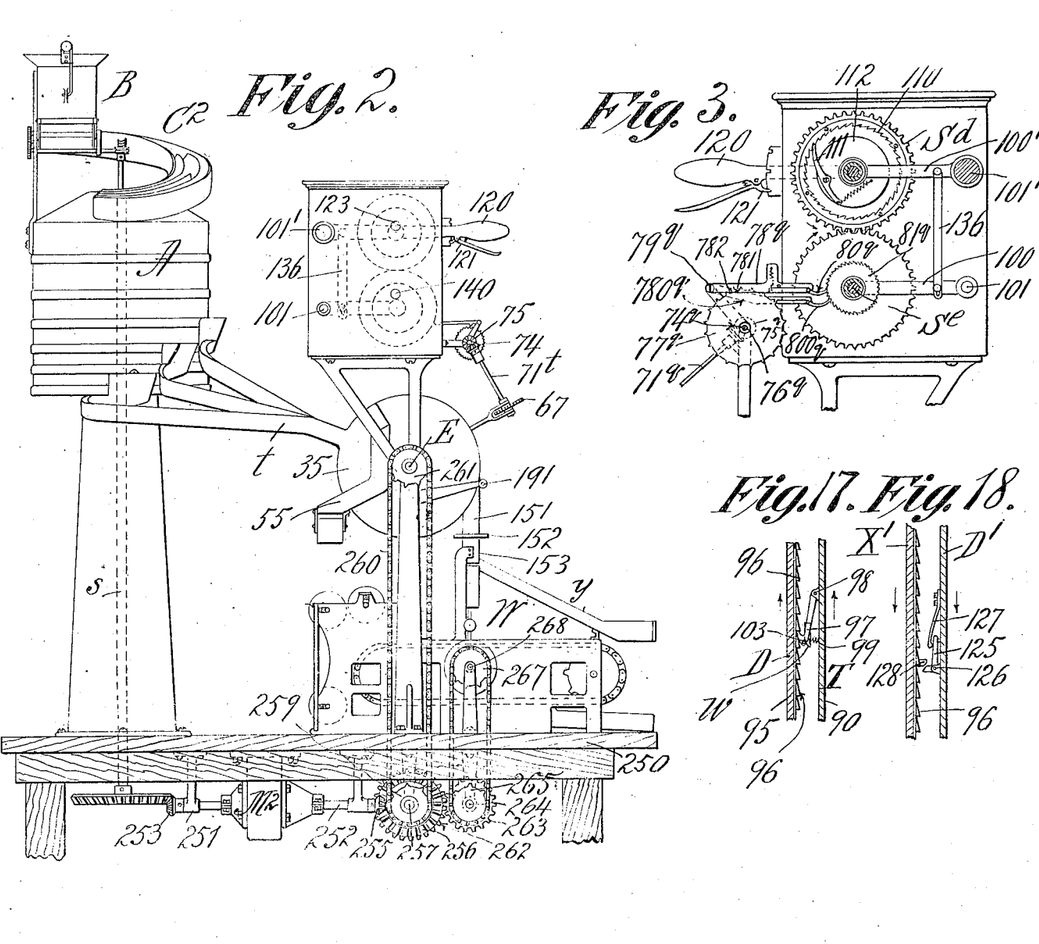
Fig. 2 is an end view thereof, as seen from the left of Fig. 1.
Fig. 3 is a fragmentary section, on line 3, of Fig. 1.
Fig. 17 shows a section on line 17—17, of Fig. 15.
Fig. 18 is a section on line 18 of Fig. 15.
Figure 5:
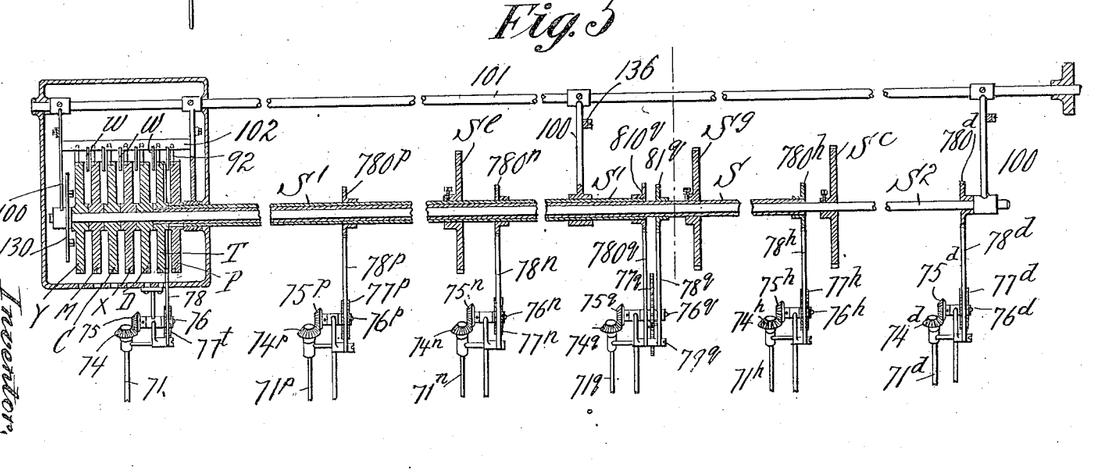
Fig. 5 is a similar view on line 5—5, Fig. 1.
Figures 7, 8:
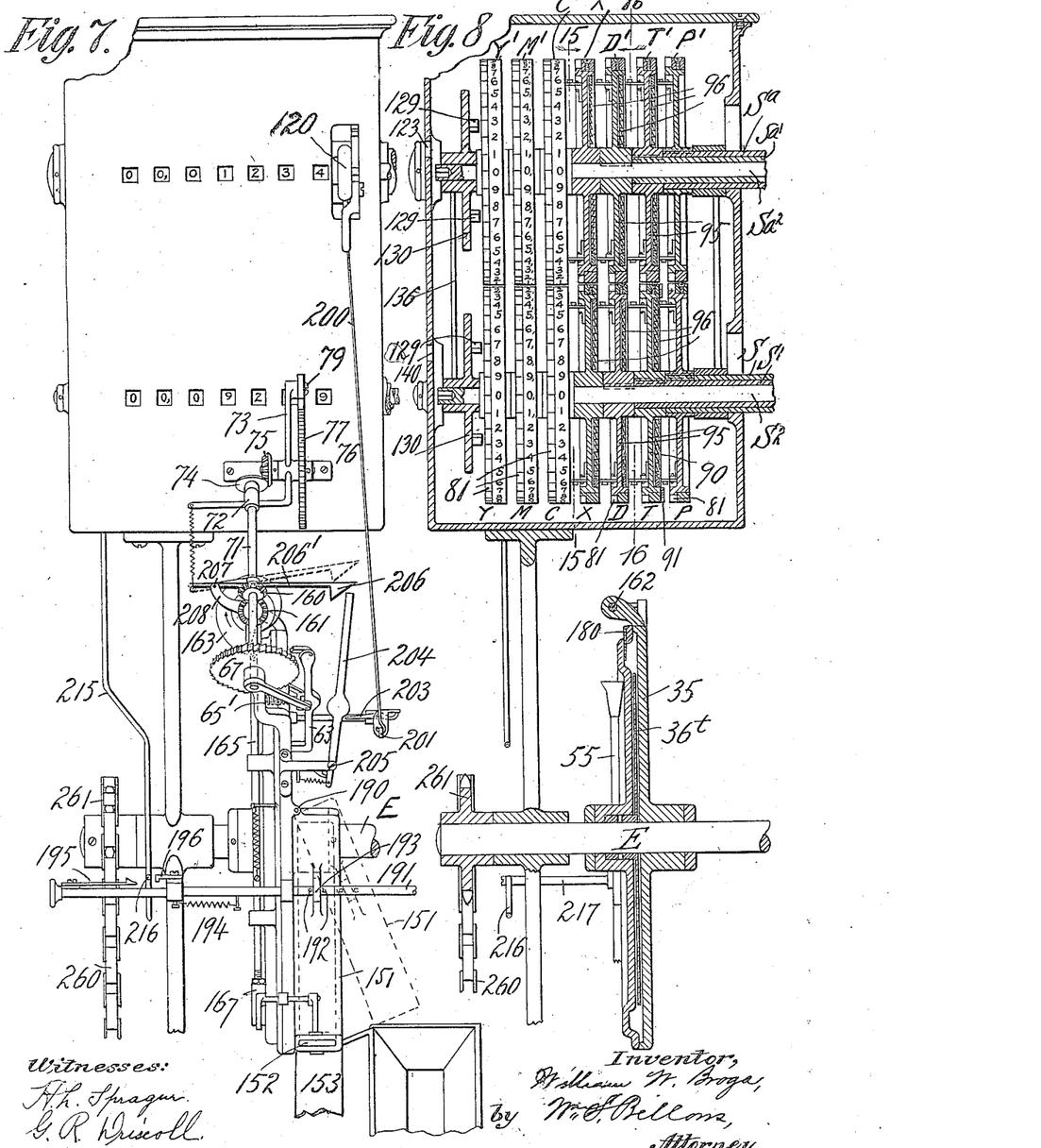
Fig. 7 is a front view thereof, corresponding with Fig. 1.
Fig. 8 represents a vertical section on line 8—8, of Fig. 6.

In Fig. 8, the dime-registering wheel is denoted by T, and the four sets of numbers (from 0 to 9 each) are marked in plain figures on a ring 91 preferably removably secured to the wheel web 90, and taking up only a portion of the face width thereof. The balance of the face of the wheel T is provided with teeth or notches (see Fig. 16) adapted to be engaged by a spring-actuated detent such as 92, whereby the wheel T is held against accidental rotation and unless positively actuated either by hand or by the pawl 80 engaging the ratchet 81 above described, the latter being made in the form of a ring secured to the side of the web 90. The next wheel of the series, viz., the dollar-registering wheel D is located at the left of the dime-wheel, and carries an annular side-ratchet 96, (see Fig. 17) whereby the wheel D is rotated for one tooth at the time when the number 0 of the dime-wheel is carried into reading position. The latter, T, carries a series of four hooks 97, (see Figs. 15 and 17) pivoted at 98 and normally withdrawn from engagement with the side ratchet 96, by a pull spring 99, Fig. 17 showing the hook 97 in its engaging position, however. All of the register wheels are movable independently of each other on an axis having its support in arms 100, (Fig. 5) secured upon a rock-shaft 101 to be hereinafter described, and the first pair of said arms carry a tie 102 having a series of inwardly-projecting wings, w, each of which is beveled at its upper edge (see Figs. 15 and 17) so that, for instance, when the dime wheel shows the number 9 on the reading line, one of its hooks 97 will be in position to be forced into engagement with the side-ratchet 96 of the dollar wheel. This is accomplished by a pin 103 projecting from the free end of the hook far enough to ride over the beveled surface of the wing w, which action will cause the required engagement with the side ratchet for a distance substantially equal to one tooth, whereupon the pulling spring 99 will become effective in withdrawing the hook from said ratchet, leaving the latter then again disconnected. The same construction exists between each adjacent pair of register wheels, P, T, D, X, C, M, Y, which, reading from right to left, indicate pennies, dimes, dollars, tens of dollars, hundreds of dollars, thousands of dollars, and tens of thousands, seven wheels being illustrated, but it is of course evident that this number may be increased or decreased as desired, to accord with the scope of the machine and with the denominational species of coins handled therein.

For the sake of ready comprehension of the following description relating to the registration of the coins passing through the several coin chutes, the cent-registering wheel is indicated by P, the dime wheel by T, and the dollar wheel by D, corresponding with the characters (in italics) of the chutes, p, t, and d, respectively, and the organization is such, that the passage of each cent turns the cent-wheel P one notch, each nickel or five-cent piece turns the cent-wheel P five notches, each dime turns the dime wheel T one notch, each quarter turns the dime wheel T two notches and the cent wheel P five notches, each half dollar turns the dime-wheel T five notches, and each silver dollar turns the dollar wheel D one notch.

From the foregoing it will be seen that the cents, dimes and dollars, turn their respective record wheels one notch each, so that the construction of the several coöperating parts may be similar throughout. In the case of the half-dollar and nickel, five notches are turned on the dime and cent wheels, respectively, so that these two organizations may be similar. In the registration of the quarter dollar, the cent wheel as well as the dime wheel are actuated, and, in order to avoid a simultaneous action of these registering wheels, which action might at a certain time fail to register the full value of the coin, means are provided whereby the registering action is split into two consecutively-operative periods, as is illustrated in Fig. 3. The passage of a quarter coin will result in turning the shaft $71^q$, and (through bevel pinions $74^q$ and $75^q$) partially rotating the spindle $76^q$. This spindle carries a notch-wheel $77^q$ adapted to actuate a pair of levers $78^q$ and $780^q$ consecutively, the lever $78^q$ having a pin 781, while the lever $780^q$ carries a pin 782, both pins being in engagement with the notch wheel $77^q$ above named, but disposed one in advance of the other, whereby not only the lever $780^q$ will be actuated in advance of the lever $78^q$; but a greater rise will be imparted to the free end of the former, in view of the difference in the distance between the pins 781, 782 from the lever fulcrum $79^q$ respectively.

The lever $78^q$ carries a pawl $80^q$ for engaging a ratchet $81^q$ and rotating the same for two teeth for every rise of the lever, and, inasmuch as the ratchet $81^q$ is secured upon a sleeve S, (see Fig. 5), the left hand of which carries the dime registering wheel T, it follows that the latter will be turned to record 2 dimes for every rise of the lever $78^q$. As soon as this lever has performed its duty, the lever $780^q$ will, by virtue of a pawl $800^q$, turn a ratchet $810^q$ which is secured upon one end of a sleeve S', for a distance of five teeth, and, since the sleeve S' carries at its left end the cent-registering wheel P, it follows that the latter will be rotated to add five cents to the record.

The registration of the half dollar is accomplished by the passage of a coin from the chute $h$ resulting in actuating the shaft $71^h$, bevel pinions $74^h$, $75^h$, spindle $76^h$, and notch-wheel $77^h$, to raise the lever $78^h$, the pawl of which will turn a ratchet $780^h$ also secured upon the dime-registering sleeve S, for five notches thus increasing the previous score by five dimes. The registration of the nickel takes place upon the passage of a coin from the chute $n$, whereby it actuates the shaft $71^n$, bevel pinions $74^n$, $75^n$, spindle $76^n$, and notch-wheel $77^n$, to raise a lever $78^n$, the pawl of which turns a ratchet $780^n$ attached to the cent-registering sleeve S'; this movement will rotate the cent-wheel P five notches, adding five cents to the score. The cent-piece is similarly taken care of by a coin passing from the chute $p$ and slightly turning the shaft $71^p$, bevel pinions $74^p$, $75^p$, spindle $76^p$, and notch wheel $77^p$, to actuate a lever $78^p$, the pawl of which rotates a ratchet $780^p$ for one notch, and as this ratchet is also secured upon the cent-registering sleeve S', the register-wheel P will show an increase of one cent on the reading line. A silver dollar passing from the chute $d$ will partially rotate the shaft $71^d$, pinions $74^d$, $75^d$, spindle $76^d$, and notch wheel $77^d$ to actuate a lever $78^d$ secured upon a shaft $S^2$ which also serves to support loosely the sleeves S, S', each one being free to be operated without disturbing the others. Secured to the shaft $S^2$ near the other end thereof, is the dollar registering wheel D, and beyond the latter the other progressive register wheels, X, C, M, Y, above mentioned, are loosely supported for independent rotation as controlled by the preceding one of each adjacent pair. This completes the description of the registering mechanism, which may be used to register a day's receipts comprising a number of individual deposits, each of which may consist of a mass of coin deposited in the hopper, and, in order to keep a proper account of the individual deposits, I deem it advantageous to provide another registering device, which is in the present instance actuated from the one just described, and which may be reset to 0,000,000 after each mass-count, so that one register device will give the result of each individual deposit for verifying the reports, and the other will show the total receipts of the day.

Figure 1:
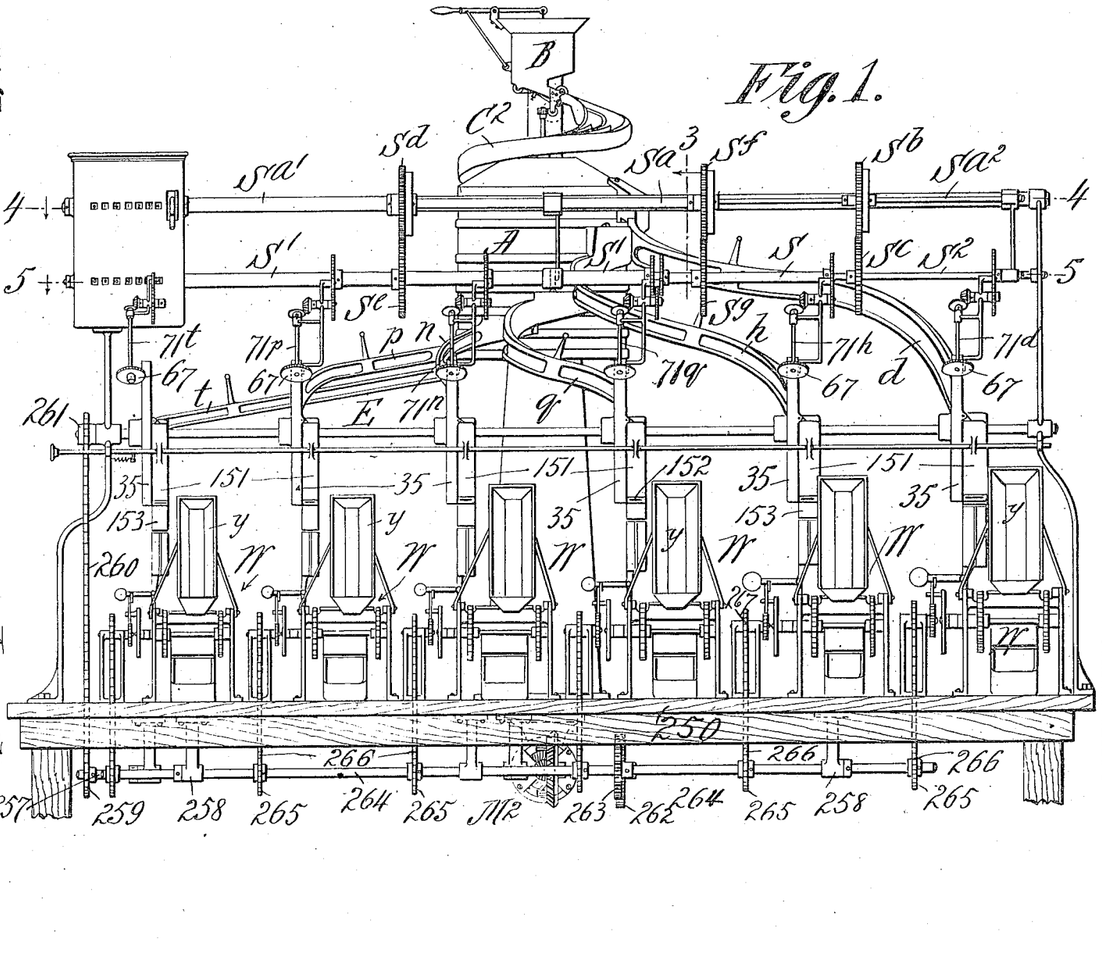
Figure 1 represents a front view of the machine, complete.
Figure 4:
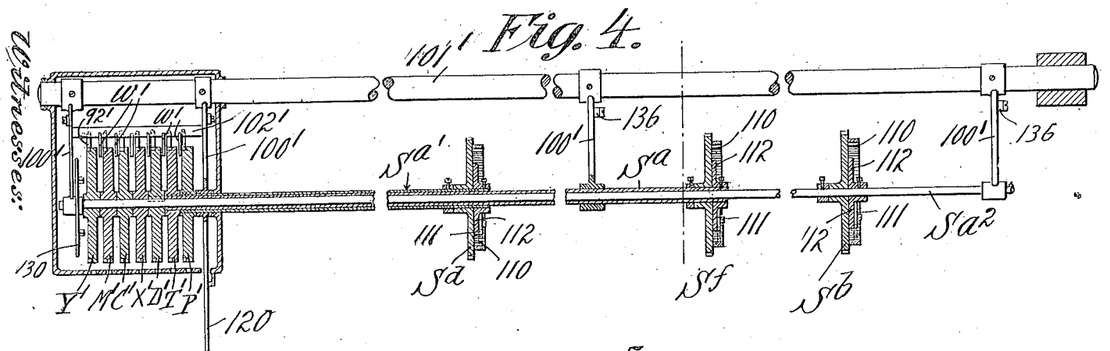
Fig. 4 is a horizontal longitudinal section on line 4—4, of Fig. 1.

The manner in which the individual register is operated is clearly shown in Figs. 1, 3, and 4; and it may be stated at this time that the transmission of progressive movement from one register wheel to the next of the series, may be precisely alike in both devices. Furthermore, it will be readily understood from the previous description that, as a matter of fact, the primary register wheels P, T and D are actuated by the several coins through the intervention of the sleeves S, $S^1$ and shaft $S^2$, different extents of movements being imparted thereto according to the values of coins and in the manner described. The several coin-carriers $56^t$, $36^p$, $36^n$, $36^q$ and $36^d$ (see Fig. 9) are secured upon the shaft E, one in advance of the other, so that one coin will have been registered, before the next carrier advances its coin to the registering mechanism. Now, inasmuch as the actual registering factors consist of the sleeves S, S' and shaft $S^2$, I provide a similar set of factors $S^a$, $S^{a1}$, $S^{a2}$, for the individual counter, and connect the two sets of factors by gears, which are normally in mesh, but may be separated when it is desired to reset the individual counter without disturbing the total register device. The several register wheels of the individual computer are designated by Y', M', C' X', D', T', P', the last three being operated by the shaft $S^{a2}$, and sleeves $S^{a1}$, $S^a$, to which they are secured, respectively. The shaft $S^{a2}$ has a gear $S^b$ engaged by a gear $S^c$ on the shafts $S^2$; the sleeves $S^{a1}$ carries a gear $S^d$ operated by a gear $S^e$ on the sleeve $S^t$, and the sleeve $S^a$ is operated by gear $S^f$ from a gear $S^g$ on the sleeve S, the sleeves $S^a$, $S^{a1}$ and shaft $S^{a2}$ being supported in arms $100^1$, secured upon a rock shaft $101^1$, which is journaled in the frame of the machine, and which carries a hand lever 120 whereby the shaft $101^1$ may be rocked to disengage the gears $S^b$, $S^d$ and $S^f$ from the gears $S^c$, $S^e$, and $S^g$ respectively. Detents or wings $w^1$ are provided for the several register wheels of the individual counter respectively and their construction and operation is similar to that of the wings $w$ above mentioned.

Figure 19:
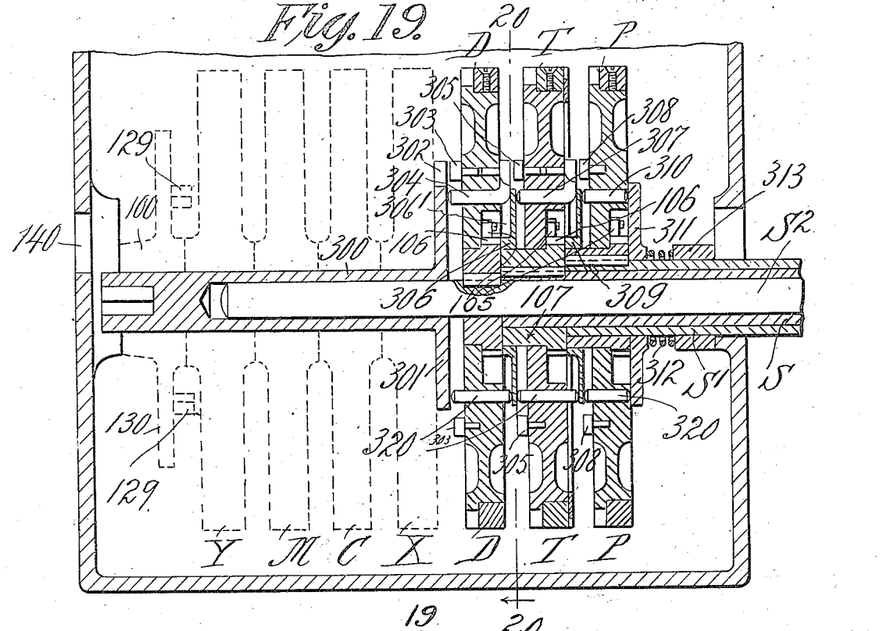
Figure 20:
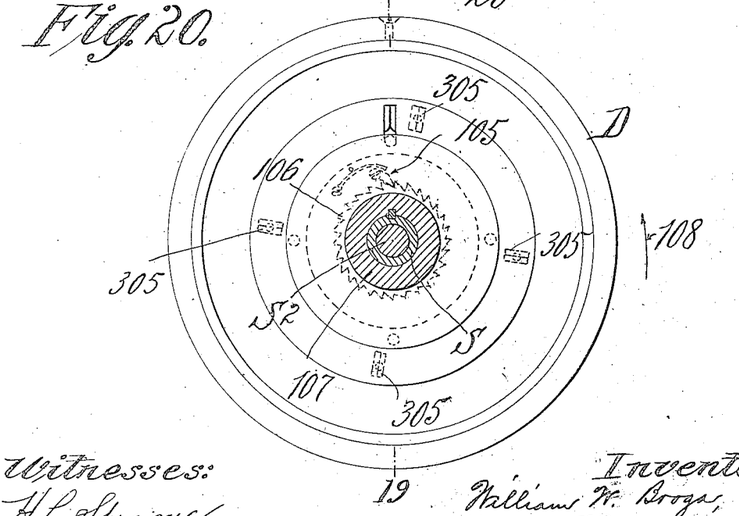

Means are provided whereby a proper registration of the several coins will be effected on both computers. For example, referring to Figs. 7 and 8, the reading index of the lower computer shows nine units or cents, while the upper computer indicates four cents in the unit column. When now a cent-coin is carried past the feeler 63 (see Fig. 6), of the counting mechanism, the figure 9 of the unit column in the lower counter will be changed to 0, and the next, or dime column, will show an increase of one over its previous register. Inasmuch as the passage of this coin will, by virtue of the cent-registering mechanism, (which includes the gears $S^g$ and $S^f$), cause the figure 4 of the unit column of the upper counter to be changed to 5, it is self evident that means must be provided whereby the dime wheel of the lower counter may be actuated or advanced by the unit wheel of said counter, without in any way disturbing the dime wheel of the upper counter. For that reason, I deem it advantageous to provide an organization such as is shown in Figs. 19 and 20, in which the dime wheel T is illustrated substantially as being in the nature of a webbed ring having a small pawl 105 adapted to engage with the ratchet 106 formed on a hub 107, which in turn is rigidly secured to the sleeve S. The direction of movement which is imparted to the wheel T is indicated by arrow 108, and, therefore, it will be seen that said wheel T may be actuated from the unit wheel P through the hook connection 97 without disturbing the sleeve S. On the other hand it is evident that when the sleeve S is actuated by the one-half dollar or quarter mechanism, the dime wheel T will be advanced in unison with said sleeve S. The same circumstances just described exist in precisely the same manner between the dollar wheel D and the dime wheel T, in connection with the shaft $S^2$ and sleeve S, respectively. In a like manner, means are provided whereby the advancement of either the cent, dime or dollar wheels of the upper counter, designated by $P^1$, $T^1$ and $D^1$, respectively, may take place without in any way interfering with the actuating factors of the lower counter.

The construction, which is shown herein, illustrates the gears $S^b$, $S^d$, and $S^f$, as being loosely mounted upon the respective shaft $S^{a2}$ and the sleeves $S^a$, and $S^{a1}$, and when said gears are actuated from the gears on the lower counter in the manner above described, and is more particularly shown in Fig. 3, it will be seen that, for instance, the gear $S^d$ will, through the intervention of an internal ratchet 110 which is secured thereto, actuate a disk 112 through a spring-pressed pawl 111, which is pivotally held on the disk 112 secured to the sleeve $S^{a1}$.

The construction of the gears on the upper computer is similar to the one described, and acts as follows: Supposing that the unit column of the upper counter shows figure 9 and that the unit column of the lower counter shows figure 4, it follows that the registration of the next cent coin will entail the advancement of the dime wheel on the upper computer to the extent of one notch or number, while the dime wheel of the lower computer must not be at all affected. By the organization just described, the dime wheel $T^1$ of the upper computer will, during its advancement of one tooth, necessarily slightly rotate its sleeve $Sa$, thereby moving the pawl 111 in unison therewith, but leaving the gear $Sd$ in its original position. When it is desired, at the completion of an individual computation, to reset the upper registering mechanism to zero, the handle 120 may be raised to bring a catch 121 thereof in engagement with a notch 122, when the square socket end of the spindle or shaft $Sa^2$ will be in alinement with an aperture 123, through which a square key may be inserted to turn the shaft and its dollar-register wheel back, it being understood, of course, that at this time the several gears are out of mesh. The dollar wheel $D^1$ carries at its left side face one or more by-passes 125 (like those shown in Figs. 15 and 18), pivoted at 126 and actuated by a spring 127, and the ten-dollar wheel $X^1$ is provided with one or more posts 128, so that when the dollar wheel is turned backward for resetting, the post 128 will be engaged by one of the by-passes 125, at which time the similar index numbers on the wheels $D^1$ and $X^1$ will be in horizontal alinement. Likewise, the wheel $X^1$ has similar by-passes on its other side face to engage similar posts on the hundred-dollar wheel $C^1$, and so on through the series, the by-passes of the last wheel Y being adapted to encounter posts 129 of a stationary plate 130, whereby the position of the numeral 0 of said wheel relative to the reading line is established. After the day's receipts are totaled on the lower computer, the latter should be reset for the next day's work, and for that reason the lower computer is supported on the arms 100 above mentioned as being secured upon a rock shaft 101.

While the resetting-mechanism above described may be properly applied to the registering wheels, commencing with the dollar wheel D and consecutively reversing the wheels X, C, M and Y, this mechanism cannot be employed in resetting the dime and penny-wheels T and P respectively, since it would interfere with their independent advancing movements as controlled by the passage of cent coins or dimes, for this reason: There may be a time when, for instance, thirty-pennies are to be consecutively recorded, before the dime wheel is touched at all, by the passage of a dime. Hence it is evident that the penny-wheel must be enabled to advance thirty teeth without permanently engaging the dime wheel. Again, the dime wheel may register fifty dimes, before a single penny coin will enter the machine, and therefore it is essential that this registering movement should be possible without touching the cent-wheel P. Inasmuch, as the mechanism above described will not permit of these constant independent movements of the registering wheels P, T and D relative to each other, when advancing, I have shown in Figs. 19, 20, a device which is adapted for resetting the cent, dime and dollar wheels, especially, and which may also be extended into a system for resetting all of the register wheels belonging to the computer, and yet not interfere with the individual independent movements or with the progressive actuations of said wheels. Mounted on the shaft $S^2$ is a sleeve 300, movable longitudinally thereon, and having a flange 301 provided with a tooth 302 for engaging one of a series of strikers 303 set into and held in the web of the dollar wheel D, and at the same time actuating a lock bolt 304, slidable in the web of said wheel, into engagement with one of a series of strikers 305 carried by the dime wheel T. This movement will result in shifting a sliding collar 306, the flange 306' of which is in constant contact with a lock bolt 307, carried in the dime wheel T and the right hand end of which is adapted to engage one of a series of strikers 308 on the cent recording wheel P. The sliding movement of the bolt 307 will slide a collar 309 longitudinally of the axis of the shaft S and act upon a series of pushers 310, mounted for sliding movement in the cent-wheel P, these pushers in turn moving a collar 311 to compress a spring 312 resting against a stationary collar 313, and operative to return the lock bolts to their normal and disengaging positions shown in Fig. 19. From the foregoing description it will also be seen that the several bolts will be pushed into engagement with their respective strikers simultaneously, and that when said sleeve is pushed toward the right and subsequently turned backward, the dollar wheel will be the first one affected; while the dime wheel and penny wheel will be successively operated in their turn. Pins 320 may be employed for equalizing the strain on the several disks respectively.

Referring to Fig. 6, it will be seen that as the catch 121 of the hand lever 120 enters the notch 122, the upper computer will be lifted clear of the lower computer, and when the upward movement of said handle is continued, to enter the catch 121 into the top-notch 135, both computing devices will be raised in unison by virtue of a slotted link 136, connecting the arms 100 and $100^1$. As the lever 120 is raised to engage the notch 122, the shaft $Sa^2$ will be brought into alinement with the aperture 123, as above described, while the lower computer remains in its position. By still further raising said handle to engage the notch 135, the shaft $Sa^2$ will pass beyond said aperture, and the shaft $S^2$ of the lower computer will be brought into position opposite an aperture 140, in which position the wheels of said computer are free from their actuators, so that a key may be applied to the end of the shaft $S^2$, and the entire mechanism set back to zero. The handle 120 may now be dropped to its normal position to return both counters to place, ready for work.

Thus far I have dealt with the registration of the monetary value of the several coins as they pass into the machine, and I will now explain a mechanism whereby the coins are counted numerically into certain quantities to form packages of predetermined value. In the present instance the organizaton of the machine is such as to count off ten silver dollars; twenty half dollars representing a ten dollar roll; twenty quarters representing a five dollar roll; fifty dimes representing a five dollar roll; twenty nickels representing a one dollar roll; and fifty cent-pieces to constitute a half dollar package. Inasmuch as the mechanisms which I preferably employ for counting off the coins of the several denominations, are substantially similar, the following description of the dime-counting device is deemed sufficient, and will apply to the other denominations as well. After the coin is carried by the carrier $36^t$, past the registering feeler-lever 63, it encounters a deflector or inwardly-projecting lip 150 (see Figs. 9 and 11), whereby the coin is guided through the aperture 60 into a coin-receiving pocket or tube 151 closed by a removable gate preferably consisting of a pair of horizontally-slidable plates 152 (see Fig. 6). At the beginning of the counting-off operation these plates are together so as to meet in the middle of the tube, and each coin, as it is registered by the mechanism above described will become instrumental in moving the plates apart, step by step, until the last coin of the required number has effected the complete withdrawal of the plates from the tube, and the entire column of coins accumulated in the tube will drop through a chute 153 into the wrapping machine which is designated in a general way by W, and which constitutes the subject matter of the said separate application for Letters Patent, filed by me on Dec. 19, 1904.

The mechanism whereby the plates 152 are gradually pushed apart by the successively-registered coins, is clearly shown in Figs. 6 and 7, in which it will be seen that the shaft 71 carries a bevel gear 160 meshing with and driving another bevel gear 161 secured upon a horizontally-disposed shaft 162, which is journaled in the frame of the machine. The lower end of the rod 165 carries a fork 167 having a pin $167^a$ in engagement with a pair of angle-levers 169, $169^1$, pivoted at 170, $170^1$ respectively, and actuating the slide-plates 152, as clearly seen in Fig. 6, in which the coin pocket has its full quota of fifty coins, and the rod 165 has been pushed down as far as the snail cam 163 can act thereon. The discharge of the coins from the pocket 151 by the complete withdrawal of the closing plates 152, will be effected by the next advancing carrier lug 40. Pivoted on an ear 175 of the carrier case, is a vertically-movable arm 176 which is held in engagement with a wiper cam 177 (mounted on the shaft 162) by a spring 178, and pivoted at the end of the arm 176, is a lever 179 having an abutment 180 adapted to enter said case, and to project into the path of the carrier lugs 40. The other end $180^1$ of the lever 179 is at present disposed above and in contact with a projection 181 on the rod 165, and it should be understood at this time, that the last rotational movement of the shaft 162 has resulted in depressing the arm 176 far enough to bring the abutment 180 into such position that the next lug 40 will lift the same, and consequently depress the lever end $180^1$ and the rod 165 to its full extent, thus withdrawing the plates 152 entirely from the chute 151, and permitting the coins accumulated therein, to drop into the wrapping machine.

The carrier lug 40 which has in the above-described manner been effective in releasing the coins in the pocket 151, may then carry another coin into contact with the registering feeler 63, whereby the shafts 71, 162 will be turned one space, thereby permitting the arm 176 to fly upward into its normal position and thus bring the upper edge of the feeler blade 180 into contact with a stop pin 185 attached to the carrier case. This will result in rocking the lever 179 on its fulcrum and in throwing the lever end $180^1$ upward, and, therefore, permitting the rod 165 to be raised by a spring 186, thus closing the plates 152 again, ready to receive and hold the coin as it drops through the aperture 60 in the carrier casing into the pocket 151. A blade spring 187 may be employed for frictionally holding the lever 179 to insure smooth action. Now, inasmuch as my improved machine will continue to count and deposit coins in the several collecting tubes, it is evident that, when the machine has registered its last coin, there may be some coins left in the tubes, not sufficient to constitute a package. Hence I provide means for discharging all the surplus coins from the tubes in such a manner that they will not enter the wrapping machine but are dropped outside, into the trays $y$.

By referring to Fig. 7, it will be seen that the tube 151 is hinged at its upper end, as at 190, for side-swinging movement; while the coin-retaining slides are permanently located in the chute 153. The several coin tubes are, in the present instance, capable of being thrown outward simultaneously by a longitudinally-disposed push-rod 191, supported on the machine frame, and having pins 192 disposed at opposite sides of an ear 193 attached to the tube, so that a longitudinal movement of the rod 191, from left to right will result in throwing the tube into the position shown by dotted lines in Fig. 7. A spring 194 may serve to return the rod, and, therefore, the tubes, to their normal positions; on the other hand this return movement may be prevented by a spring detent 195 carried on the rod 191 and engaging a catch 196 on the frame, to retain the tubes in their thrown-out positions. The registrations of what may be termed the "surplus" coins, entails necessarily some movement of the shaft 162, so that, when the machine has completed its day's work, and the counters have been reset to zero, this shaft should be turned to its initial or starting position, viz: such as to leave the rod 165 in its highest place with its rollers 164 resting against the lowest part of the cam 163. In order to insure this action taking place, I deem it advantageous to provide means, whereby the elevation of the handle 120 into its highest position will cause said shaft 162 to be rotated step by step by the diametrically-opposed lugs of the continuously rotating carrier 36 as follows: Attached to the handle 120 is a rod-link 200, the lower end of which is secured to the end of a lever 201, fulcrumed at 202 and carrying a by-pass, 203. As the handle 120 is raised to have its detent 121 enter the notch 135, the by-pass 203 will engage and force toward the left (Fig. 7) an arm 204 which is fulcrumed at 205 and the upper end of which will thus be forced under and behind a hook or trigger 206, at the same time throwing the fulcrum point 64 of the feeler lever 63 toward the carrier casing (as permitted by the spring 65¹) on the bolt 65 above mentioned (see Fig. 14.) This movement will bring the feeler end of said lever into the path of the lugs 40 on the carrier, so that every time when a lug passes said feeler, the lever 63 will be oscillated and thus actuate the ratchet 67 one tooth, thus turning the shafts 71 and 162 step by step, until the feeler lever is withdrawn from the carrier casing, which action takes place automatically as soon as the cam 163 has arrived in its initial or starting position. The means for accomplishing this result consists substantially of a wiper cam 210 secured in proper position on the shaft 162 (see Fig. 6) and raising the hook lever 206¹, which is pivoted at 207 on a stationary ear 208 of the frame work (the raised position being indicated by dotted lines in Fig. 7.) This action will release the arm 204, and the feeler lever is then at liberty to be pushed bodily away from the carrier casing, by the spring 65¹ above referred to. The computers having both been reset to zero, and the cam shaft 162 being returned to its starting position, the handle 120 may be dropped to connect the computers and bring them within reach of the actuators, at the same time detaching the detent 195 from the catch 196 by means of a rod 215 the upper end of which is secured to one of the arms 100, and the lower end of which is jointed to a presser lever 216, pivoted at 217 and having its forward end projecting over the detent 195 above mentioned. Inasmuch as the rod 191 is thus released, the several tubes 151 are then returned to their normal positions over the gate plates 152. The machine is now again ready for work, which will commence with the first coin passing through one of the coin chutes and conveyed by the carrier into engagement with its feeler and registering lever.

The general organization of the machine is as follows: The mechanism in its entirety is mounted upon a table 250, supporting in bearings 251, a shaft 252, to which continuous rotary motion may be imparted from a motor M². One end of the shaft 252 carries a bevel pinion 253 driving a vertical shaft $s$ of the sorting machine the operation and function of which can be readily ascertained by reference to the application No. 230,833, above referred to. The other end of said shaft has a bevel pinion 255 driving a bevel gear 256 secured on a shaft 257 which constitutes the main driving shaft of the present machine, and which is journaled in bearings 258 secured to the table. One end of this shaft carries a sprocket 259, connected by a chain 260, with a sprocket 261, mounted upon the carrier shaft E, which is in this manner driven continuously, and said shaft 257 also drives the wrapping machines W, through a gear 262 meshing into a gear 263 secured upon a shaft 264, which carries a series of sprockets 265, connected through chains 266, with sprockets 267 on the several actuators 268 of the wrapping machines, respectively.

From the foregoing description, it will be understood, that the entire machine is in reality a self-contained device, the several mechanisms of which are permanently and coöperatively connected, so that the coin masses deposited in the hopper are computed according to their values, and delivered from the machine in the form of sealed packages or coin-rolls of certified values.

While in an early portion of this specification mention was made of a manner of employment of the machines for assorting, counting and registering, and wrapping and delivering coins, available in street and other railway offices, it is, of course, apparent that this machine may be used in a manner to show at each "turning-in" the individual conductor's coin receipts covering any usual period and showing the aggregate of the "inturnings" of all of the conductors; and the machine, moreover, is available in department stores, banks, treasuries, theaters, and in fact many places which are self suggesting. And while as necessary, precise and detailed description has in this specification been made of the devices substantially as shown, I wish it to be understood that my invention is to cover broadly, in many respects, instrumentalities coöperative in a novel manner for the performance of many of the functions inherent in the complete machine, and that considerable latitude of change and departure from the specific devices herein shown and described with particularity may be made without departing from the gist of this invention.

Having thus described my invention, what I claim and desire to secure by Letters Patent is:

1. The combination with a coin sorting mechanism, comprising a series of chutes, of a registering mechanism, a coin-carrier for bringing said coins into forcible contact with the registering mechanism and an escapement device operably controlled by said carrier and for permitting only one coin at a time to enter the carrier.

2. The combination with a registering mechanism, of a coin-carrier for bringing the coins into forcible contact with the registering mechanism, an escapement device for permitting only one coin at a time to enter the carrier, and comprising a rock spindle, retaining pins carried thereby and alternately effective in admitting and checking consecutive coins in their travel toward the carrier.

3. The combination with a registering mechanism, of a carrier casing comprising a runway, an escapement device for permitting only one coin at the time to enter the carrier casing, means for positioning a coin in the runway, and a coin carrier for bringing the coins into forcible contact with the registering mechanism.

4. The combination with a registering mechanism, of a carrier casing comprising a runway, an escapement device for permitting only one coin at a time to enter said carrier casing, a stop plate and a ledge for positioning the coin in the runway, and a coin carrier comprising a plurality of coin engaging lugs for bringing the coins into forcible contact with the registering mechanism.

5. The combination with a chute, of a registering mechanism, a coin-carrier for bringing the coins into forcible contact with the registering mechanism, a carrier casing to which such chute leads having an opening a guard plate for normally closing said opening, and a detector lever operable by an overthick coin to open said guard plate, and to expel said coin from the casing preparatory to the registration thereof by the registering mechanism.

6. The combination, with a chute, of a registering mechanism, a coin-carrier for bringing the coins into forcible contact with the registering mechanism, a carrier casing to which said chute leads having an opening, a guard plate for normally closing said opening, and a detector lever, and a roller carried by said lever and adapted to enter the path of the coin in the casing.

7. The combination, with a chute, of a registering mechanism, a coin-carrier for bringing the coins into forcible contact with the recording mechanism, a carrier casing having an opening, a guard plate for normally closing said opening, and a detector lever, and a roller carried by said lever and adapted to enter the path of the coin in the casing, and means for varying the entrance of said roller into the runway.

8. The combination, with a chute, of a registering mechanism, a coin-carrier for bringing the coins into forcible contact with the registering mechanism, a carrier casing having an opening, a guard plate for normally closing said opening, and a detector lever, and a roller carried by said lever and adapted to enter the path of the coin in the casing, and a link connecting said lever and guard plate.

9. The combination, with a coin sorting mechanism comprising a series of chutes, of a registering mechanism, a coin-carrier for bringing the coins into forcible contact with the registering mechanism, a carrier casing, to which one of said chutes leads having an opening, a guard plate for normally closing said opening, and a detector lever, and a roller carried by said lever and adapted to enter the path of the coin in the casing, a link connecting said lever and guard plate, and a spring for normally closing said guard plate and for projecting said roller into said runway.

10. The combination, with a carrier, and a registering mechanism, of a coin-receiving tube having a removable gate, and means for opening said gate upon the registration of a certain number of coins by the registering mechanism.

11. The combination, with a carrier, and a registering mechanism, of a coin-receiving tube having a removable gate, and means for opening said gate intermittently and as controlled by the action of a registering mechanism in registering consecutive coins in the carrier.

12. The combination, with a carrier, and a registering mechanism, of a coin-receiving tube having a removable gate, means for opening said gate intermittently and for nearly the full extent as controlled by the actions of the registering mechanism in registering consecutive coins in the carrier, and an independent mechanism for completing the opening movement after a full number of coins has been deposited in said tube.

13. The combination, with a carrier, and a registering mechanism, of a coin-receiving tube having a removable gate comprising a pair of slidable plates, a pair of angle levers engaging said plates, and means for actuating said angle levers to open said gate upon the registration of a certain number of coins by the registering mechanism.

14. The combination, with a carrier, and a registering mechanism, of a coin-receiving tube having a removable gate comprising a pair of slidable plates, a pair of angle levers engaging said plates, and a movable rod for actuating said angle levers, a cam for moving said rod intermittently and as controlled by the action of registering mechanism in registering consecutive coins in the carrier.

15. The combination, with a carrier, and a registering mechanism, of a coin-receiving tube having a removable gate comprising a pair of slidable plates, a pair of angle levers engaging said plates, and a movable rod for actuating said angle levers, a cam for moving said rod intermittently for nearly the full extent, and a device movable into the path of the carrier lugs and for completing the opening movement of said plates after a full number of coins has been deposited in said tube.

16. The combination, with a carrier, and a registering mechanism, of a coin-receiving tube having a removable gate comprising a pair of slidable plates, a pair of angle levers engaging said plates, and a movable rod for actuating said angle levers, a cam for moving said rod intermittently for nearly the full extent, a lever in engagement with said rod and having an abutment face, means for moving said lever into a path of the carrier lugs and for completing the opening movement of said plates after a full number of coins has been deposited in said tube.

17. The combination, with a carrier having lugs and a registering mechanism, of a coin-receiving tube having a removable gate comprising a pair of slidable plates, a pair of angle levers engaging said plates, and a movable rod for actuating said angle levers, a cam for moving said rod intermittently for nearly the full extent, a lever in engagement with said rod and having an abutment face, a cam-operated arm for moving said lever into the path of the carrier lugs and for completing the opening movement of said plates after a full number of coins has been deposited in said tube.

18. The combination, with a carrier having lugs and a registering mechanism, of a coin-receiving tube having a removable gate comprising a pair of slidable plates, a pair of angle levers engaging said plates, and a movable rod for actuating said angle levers, a cam for moving said rod intermittently for nearly the full extent, a lever in engagement with said rod and having an abutment face, a cam-operated arm for moving said lever into the path of the carrier lugs and for completing the opening movement of said plates after a full number of coins has been deposited in said tube, and means for withdrawing said abutment face from the path of the carrier.

19. The combination, with a carrier, and a registering mechanism, of a coin-receiving tube having a removable gate comprising a pair of slidable plates, a pair of angle levers engaging said plates, and a movable rod for actuating said angle levers, a cam for moving said rod intermittently for nearly the full extent, a device for completing the opening movement and comprising a cam-operated arm, a lever in engagement with said rod and pivoted intermediate its ends on said arm and having an abutment face, and a spring for withdrawing said abutment face from the path of the carrier.

20. The combination, with a coin-carrier, and a feeler lever in the path of a coin in the carrier, of a computer operable by said feeler, a rock-shaft supporting said computer, and means for operating said rock-shaft and for disengaging said computer from its actuating mechanism.

21. The combination, with a coin-carrier, and a feeler lever in the path of a coin in the carrier, of a plurality of computers each comprising a series of register wheels, and means for actuating said computers successively from said feeler, a pair of rock-shafts supporting said computers, and means for operating said rock-shafts successively to disengage said computers from the feeler mechanism.

22. The combination, with a coin-carrier, and a feeler lever in the path of a coin in the carrier, of a plurality of computers each comprising a series of register wheels, and means for actuating said computers successively from said feeler, a pair of rock-shafts supporting said computers, a slotted link connecting said rock-shafts and operating the primary rock-shaft to disengage the primary computer from the feeler mechanism subsequently to the operation of the secondary rock-shaft to disengage the secondary computer from the primary computer.

23. The combination, with a coin-carrier and a feeler lever in the path of a coin in the carrier, of a computing device for registering the values of successive coins in the carriers, and comprising a shaft for resetting the said device, a computer casing having an aperture, and means for disengaging said computer from the feeler mechanism and for bringing the computer shaft into alinement with said aperture simultaneously.

24. The combination with a coin-carrier, and a feeler lever in the path of a coin in the carrier, of a plurality of computers, each comprising a series of register wheels, means for actuating said computers successively from said feeler, a pair of rock-shafts supporting said computers, a computer casing having a pair of unalined apertures, means for disengaging said computers from the feeler mechanism, and for bringing said shafts into alinement with said apertures consecutively.

25. The combination, with a coin sorting mechanism comprising a series of chutes for the various denominations, a computing device for registering successive coins after they leave the chutes, and means for counting off certain numbers of coins of each species; of a series of tubes for receiving the counted-off coins, a series of wrapping machines coöperatively connected with said tubes, means for normally closing said tubes, and means for connecting and disconnecting all of said tubes with and from the wrapping machines.

26. The combination, with a coin carrier, and a carrier casing inclosing the carrier and comprising a runway, having a coin delivery opening, of a conductor for receiving a certain number of coins, a tube movably mounted, and located between said delivery opening and said conductor, a wrapping mechanism connected with said conductor, and means for disconnecting said tube from said conductor.

27. The combination, with a coin carrier, and a carrier casing comprising the runway having a coin delivery opening, of a conductor for receiving a certain number of coins, a tube movably mounted between said delivery opening and said conductor a wrapping mechanism connected with said conductor and a longitudinally movable rod for disconnecting said tube from said conductor.

28. The combination, with a coin carrier and a carrier casing comprising the runway having a coin delivery opening, of a conductor for receiving a certain number of coins, a tube movably mounted between said delivery opening and said conductor a wrapping mechanism connected with said conductor and a longitudinally-movable rod for disconnecting said tube from said conductor, and a device for locking said rod against return movement.

29. The combination, with a coin carrier, and a carrier casing comprising the runway having a coin delivery opening, of a conductor for receiving a certain number of coins, a tube movably mounted between said delivery opening and said conductor a wrapping mechanism connected with said conductor and a longitudinally movable rod for disconnecting said tube from said conductor, and a spring actuated detent and a catch for locking said rod against return movement.

30. The combination, with a coin carrier and a carrier casing comprising the runway having a coin delivery opening, of a conductor for receiving a certain number of coins, a tube movably mounted between said delivery opening and said conductor a wrapping mechanism connected with said conductor, and a longitudinally-movable rod disconnecting said tube from said conductor, and a spring actuated detent and a catch for locking said rod against return movement, and means for disconnecting said detent from said catch.

31. The combination, with a coin carrier, a registering mechanism comprising a plurality of computers, and means for actuating said computers simultaneously, of a wrapping mechanism, a tube for receiving a certain number of coins, a conductor for transferring said coins to the wrapping mechanism, a longitudinally movable rod for disconnecting said tube from said conductor, a spring actuated detent for locking said rod against return movement, means for disengaging the first computer from its actuating mechanism, and means controlled by the location of the primary computer, and for disconnecting said detent from said catch.

32. The combination, with a coin carrier, a registering mechanism comprising a plurality of computers, and means for actuating said computers, of a wrapping mechanism, a conductor for receiving a certain number of coins and for transferring said coins to the wrapping mechanism and comprising a movably mounted tubular section, a longitudinally-movable rod for disconnecting said tube from said conductor proper, a spring-actuated detent for locking said rod against return movement, means for disengaging the first computer from its actuating mechanism, and means for disconnecting said detent from said catch upon the return movement of the primary computer to its operative position.

33. The combination, with a coin sorting mechanism comprising a series of chutes for the various denominations, a series of coin receiving carriers coöperative with said chutes, means for counting off certain numbers of coins of each species, and a series of tubes for receiving the counted-off coins; of a series of wrapping machines, and means for connecting and disconnecting all of said tubes with and from the wrapping machine simultaneously.

34. The combination, with a coin sorting mechanism, comprising a series of chutes for the various denominations, a series of coin receiving carriers coöperative with said chutes, a plurality of coördinated means for counting off certain numbers of coins of each species and means for actuating same, and a series of tubes for receiving the counted-off coins; of a series of wrapping machines and means for disengaging the first counting off means from its actuating mechanism, and means for disconnecting the tube appurtenant thereto from its conductor, and controlled by the location of the primary counting off means.

35. The combination, with a coin sorting mechanism, comprising a series of chutes for the various denominations, a series of coin receiving carriers coöperative with said chutes, a plurality of coördinated means for counting off certain numbers of coins of each species, and means for actuating same, and a series of tubes for receiving the counted-off coins; of a series of wrapping machines, means for disengaging the first counting off means from its actuating mechanism, a longitudinally-movable rod connected with all of said tubes, means for locking said rod against return movement, and means for returning said rod and the tubes into their respective normal positions upon the return of the primary counting off means into its operative position.

Signed by me at Springfield, Mass., in presence of two subscribing witnesses.

WILLIAM W. BROGA.

Witnesses:
WM. S. BELLOWS,
G. R. DRISCOLL.